United States Patent

[11] 3,591,250

[72] Inventors Herbert William Feinstein
Lexington;
Edward Paul Morse, Norwood, both of, Mass.
[21] Appl. No. 719,658
[22] Filed Apr. 8, 1968
[45] Patented July 6, 1971
[73] Assignee Stek Corporation
Lexington, Mass.

[54] MECHANICAL IMAGE MOTION STABILIZER WITH ROTATION RATE COMPARISON SYSTEM
6 Claims, 5 Drawing Figs.

[52] U.S. Cl. .................................................. 350/16,
33/46.5, 350/285
[51] Int. Cl. .................................................. G02b 23/00
[50] Field of Search ........................................... 350/16,
285; 33/46.3, 46.5, 49.2, 49.3

[56] References Cited
UNITED STATES PATENTS
3,041,518  6/1962  Blomgrist et al. ............  33/49.2 X
3,212,420  10/1965  Cierva ........................  350/285 X
3,326,619  6/1967  Johnson et al. ...............  350/16
3,393,320  7/1968  Arazi ..........................  350/16 UX
FOREIGN PATENTS
85,785  1965  France ........................  350/16

Primary Examiner—David Schonberg
Assistant Examiner—T. H. Kusmer
Attorneys—Homer O. Blair, Robert L. Nathans, Lester S. Grodberg and Joseph S. Iandiorio ABSTRACT: Apparatus is disclosed for stabilizing image motion in optical instruments due to instrument motions normal to the line of sight by driving reflection means in the optical path of the instrument to compensate for image motion normal to the line of sight in response to rotations of the instrument about axes normal to the line of sight.

HERBERT W. FEINSTEIN
EDWARD P. MORSE
INVENTOR.

BY
Joseph S. Iandiorio
ATTORNEY

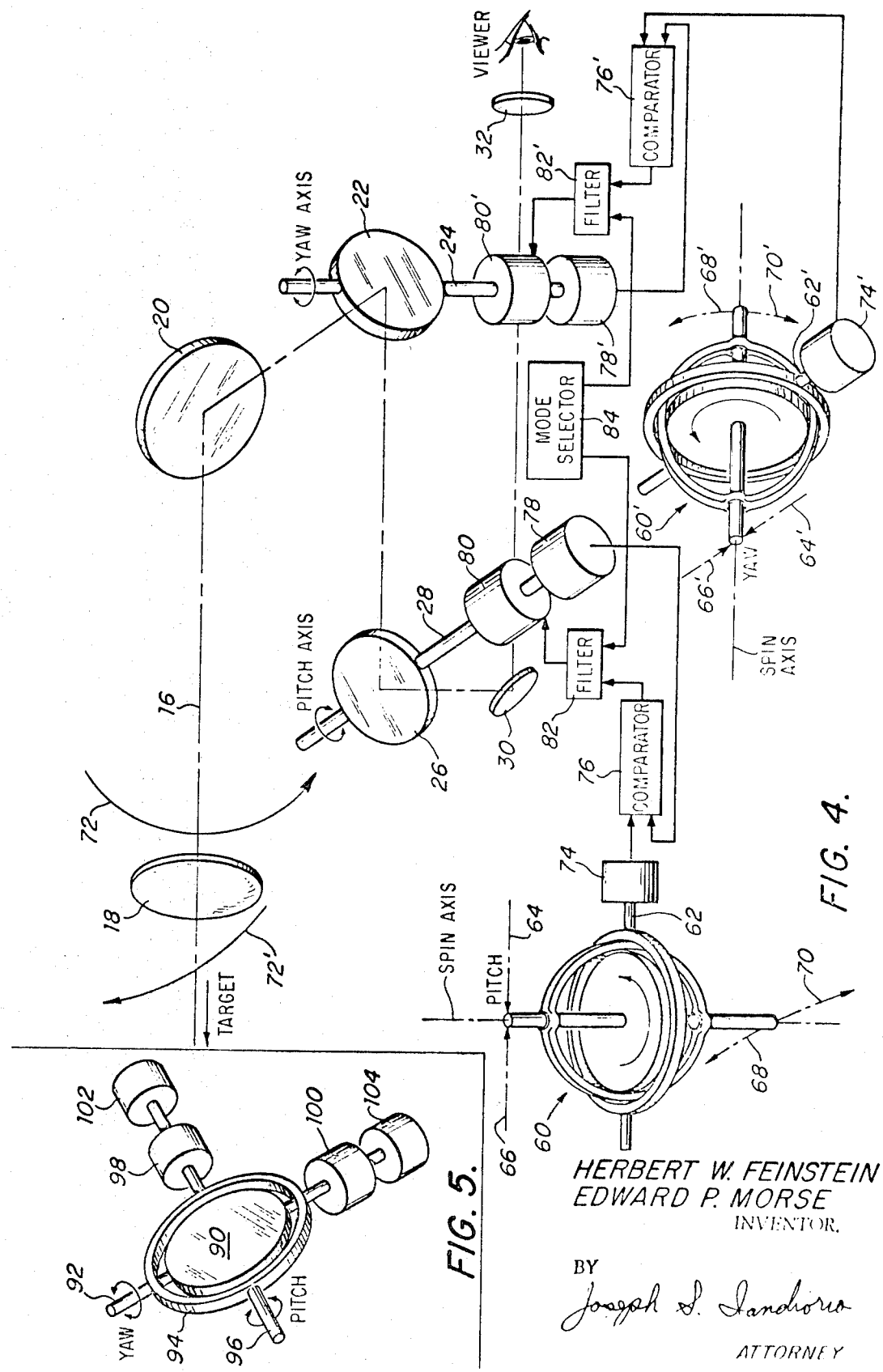

3,591,250

MECHANICAL IMAGE MOTION STABILIZER WITH ROTATION RATE COMPARISON SYSTEM

CHARACTERIZATION OF INVENTION

The invention is characterized in image motion stabilizer apparatus for compensating for image motion in instruments due to instrument rotations normal to the line of sight including radiation reflection means, means for adjusting the radiation reflection angle of the reflection means about a first axis normal to the line of sight, means for sensing the rate of rotation of the instrument about a first axis, and control means, responsive to the means for sensing, for driving the means for adjusting to adjust the radiation reflection angle of the radiation reflection means to compensate for the rotation of the line of sight caused by rotation of the instrument about a first axis.

BACKGROUND OF INVENTION

This invention relates to apparatus for stabilizing image motion normal to the line of sight in an optical instrument.

Stabilization of image motion is desirable and often a necessity in various types of optical instruments such as television cameras, moving and stationary film photographic cameras, telescopes, binoculars, and periscopes. Vibration of the images may cause blurring which the human eye and/or an optical device cannot resolve and which may cause loss of detail and clarity in temporary or permanent reproductions of the image.

The loss of detail and clarity is extremely critical in applications such as reconnaissance where small and obscure objects may be of major significance, and in cinema and television applications where clarity and detail can influence the artistic value of the work.

Image vibration is not a problem confined to applications wherein the instrument is hand held or mounted on an ambulatory support. For even in stationary mountings, vibrations from surrounding fixtures may be transmitted to the camera through the mounting.

Attempts have been made to provide devices to effect image motion compensation. An object of some of these devices is to rotate the line of sight of the instrument in the opposite direction to the rotation of the instrument so that the line of sight remains stationary relative to the viewer or recording medium. Electronic image stabilization systems, for example, require a high voltage power supply to drive the image intensifier tube and because of the nature of the phosphorescent materials used in the tube, such system are unsuitable for use with chromatic light. In addition such systems are quite large; and even in achromatic applications the image quality is not all that could be desired. Inertial gimbal stabilization systems using gyros (gyroscopes) to hold the instrument steady are also quite large and are limited in their ability to pan, i.e. sweep the line of sight of the instrument across an area. Other types of image stabilizing systems include those in which gyros are used to control the refraction of light by mechanically manipulating a pair of liquid lenses which may make for a cumbersome and complex arrangement. In some systems the optical path is long and the adjusting mechanisms or optics are large and require substantial driving power.

SUMMARY OF INVENTION

Thus, it is desirable to have available a new image motion stabilizer apparatus for compensating for image motion normal to the line of sight in optical instruments.

It is also desirable to have available such stabilizing apparatus usable in a folded optical path requiring less room and resulting in a smaller and more compact instrument.

It is also desirable to have available such stabilizing apparatus which is locatable between the objective lens and eyepiece lens enabling smaller optical elements to be used in the stabilizing apparatus.

It is also desirable to have available such stabilizing apparatus operable with one or more simple reflection elements.

It is also desirable to have available such stabilizing apparatus suitable for use in stationary or panning modes.

It is also desirable to have available such apparatus which requires low power, is light weight, and small.

The invention may be accomplished by image motion stabilizer apparatus for compensating for image motion in optical instruments due to instrument motion normal to the line of sight including radiation reflective means. Means are provided for adjusting the radiation reflection angle of the reflection means about a first axis normal to the line of sight in response to rotation of the instrument about that first axis. Control means, responsive to means for sensing the rotation of the instrument about that first axis, drive the adjusting means to change the radiation reflection angle of the reflection means to compensate for the rotation of the line of sight caused by the rotation of the instrument about the first axis.

In preferred embodiments second means for adjusting, means for sensing and control means are used to stabilize image motion relative to a second axis transverse to the first and normal to the line of sight.

DISCLOSURE OF SPECIFIC EMBODIMENT

Other objects, features and advantages will occur from the following description of a preferred embodiment and the accompanying drawings, in which:

FIG. 4 is a perspective, schematic view of the optical arrangement of FIG. 1 with motion sensing, adjusting and control equipment according to this invention.

FIG. 5 is a perspective view of an alternative reflection element according to this invention.

Figure 1:
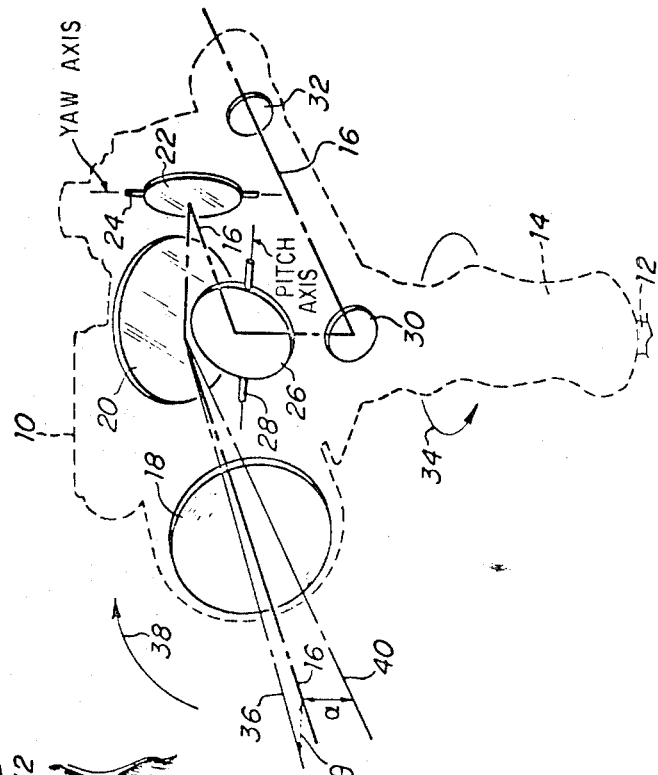
FIG. 1 is a silhouetted perspective schematic view of the optic assembly of a portable, hand held folded telescope incorporating image stabilization apparatus according to this invention.

In one embodiment utilizing separate mirrors for pitch and yaw adjustment the invention is used in a portable, hand held, folded telescope device 10, FIG. 1, powered by a remote low voltage power supply by means of cable 12 entering handle 14. Light from the target travels along the line of sight (LOS) path 16 through lens 18, is reflected from mirror 20 to yaw mirror 22 rotatable about the yaw axis on shaft 24 and from mirror 22 to pitch mirror 26 which is orthogonally mounted relative to mirror 22 and is rotatable about the pitch axis on shaft 28. From pitch mirror 26 the light is reflected to mirror 30 and then to eyepiece 32 and the viewer's eye.

If device 10 should yaw to the left, arrow 34, the LOS will be shifted to the right an amount $\theta$ and lie along path 36. And this shift causes the LOS to be misaligned along its path through device 10. Adjustment is made by rotating yaw mirror 22 a sufficient amount to relocate the LOS on path 16. Similarly if device 10 should pitch upwardly, arrow 38, the LOS will be shifted downwardly an amount $\alpha$ and lie along path 40. And this shift too, causes the LOS to be misaligned along its entire path through device 10.

Since the image stabilizing mirrors are behind the object lens 18, the mirrors may be smaller than if they were on the forward, object, side of lens 18. Smaller mirrors require less space, give greater frequency response with less driving power and weigh less themselves, therefore they afford a significant reduction in size and weight of the instrument. In addition the orthogonal mounting of the stabilizing mirror permits a folded optical path which substantially reduces the size of the instrument.

Figure 2:
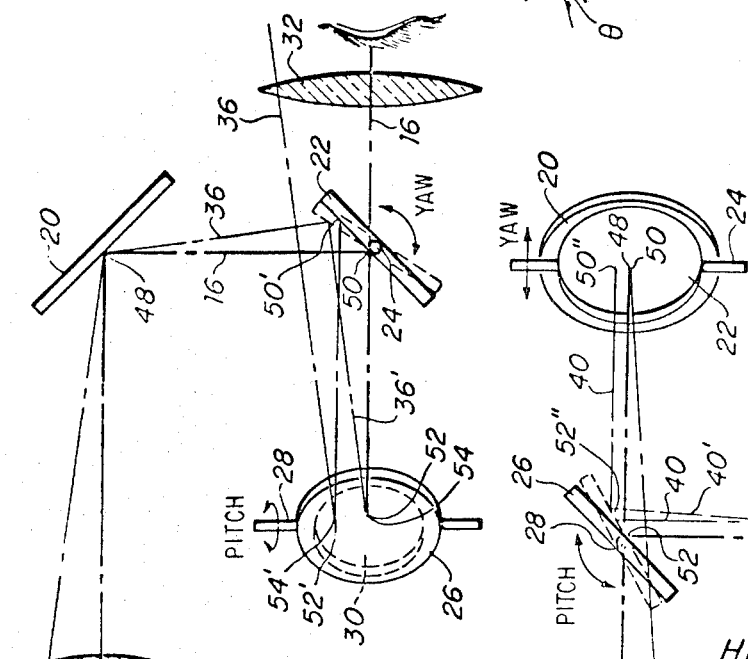
FIG. 2 is a top view of the apparatus of FIG. 1.
Figure 3:
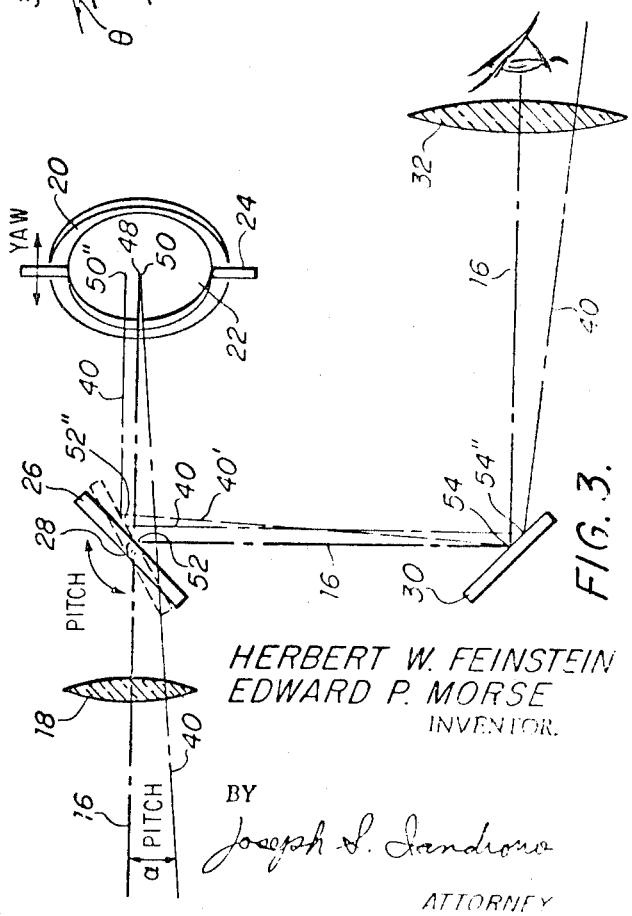
FIG. 3 is a side view of the apparatus of FIG. 1.

The correction for rotation about the pitch and yaw axes by means of rotating mirrors and the misalignment caused by such rotation is better seen in FIGS. 2 and 3. When device 10 is at rest and stabilized, the LOS from a target follows path 16 in perfect alignment through lens 18 to point 48 on mirror 20 where it is successively reflected at right angles to point 50 on yaw mirror 22, point 52 on pitch mirror 26 and finally to point 54 on mirror 30 where eyepiece 32 is directed.

Yawed by an amount $\theta$, device 10 shifts its position relative to the LOS of path 16 to path 36 at angle $\theta$. Thus the angle of incidence and angle of reflection of the LOS on path 36 is changed at each mirror and the points of incidence as well are changed at each mirror following mirror 20. Path 36 contacts yaw mirror 22 at point 50', pitch mirror 26 at point 52', and mirror 30 at point 54' so that the image is shifted to the right at eyepiece 32, FIG. 2. Despite the new orientation of device 10 the image can be made to appear in the center of the eyepiece 32 along path 16 by rotating yaw mirror 22 a small amount to change the angles of incidence and reflection, thus the direction of path 36. Since the rotation of a mirror by $\theta°$ rotates the reflected light $2\theta°$ relative to the incident light, the light leaving mirror 20 on path 36 is thus misaligned by an angle $2\theta$. Therefore, on the same principle, rotating yaw mirror 22 through an angle $\theta$ to the position shown dashed, FIG. 2, corrects the direction of path 36 to that of 36' between mirrors 22 and 26 so that the LOS is switched from misaligned path 36 to proper path 16. From mirror 26 onward the LOS coincides with path 16 and appears properly positioned at eyepiece 32.

Pitched by an amount $\alpha$, device 10 shifts its position relative to the LOS on path 16 to path 40 at angle $\alpha$. Thus the angle of incidence and angle of reflection of the LOS on path 40 is changed at each mirror and the points of incidence as well are changed at each mirror following mirror 20. Path 40 contacts yaw mirror 22 at point 50'', pitch mirror 26 at point 52'', and mirror 30 at point 54'' so that the image is shifted downwardly at eyepiece 32, FIG. 3. Despite the new orientation of device 10 the image can be made to appear in the center of the eyepiece 32 along path 16 by rotating pitch mirror 26 a small amount to change the angles of incidence and reflection, thus the direction of path 40. Rotating pitch mirror 26 through an angle $\alpha$ to the position shown dashed, FIG. 3, corrects the direction of path 40 to that of 40' between mirrors 26 and 30 so that the LOS is switched from misaligned path 40 to proper path 16. From mirror 30 onward the LOS coincides with path 16 and appears properly positioned at eyepiece 32.

The apparatus used to correct or compensate for image motion, as discussed above, must be coupled with sensing and drive apparatus, FIG. 4, in order to provide an image stabilizing function.

Pitch gyro 60 spun by means not shown at high speed about its spin axis is caged against movement except for rotation with shaft 62 about an axis parallel to a longitudinal axis i.e. path 16 between lens 18 and mirror 20, of device 10. Therefore, gyro 60 responds only to components of force applied in either direction parallel to shaft 62, vectors 64, 66, and responds by producing force normal to the applied force and 90° advanced about the spin axis in the direction of spin, vectors 68, 70, respectively.

When instrument 10 is tilted downwardly about its pitch axis in the direction of arrow 72, the force which tilts the instrument 10 also acts on gyro 60 as indicated by vector 64. The gyro reacts by rotating in the direction of vector 68 at a rate proportional to the movement of the instrument. A rotary motion sensor 74 associated with shaft 62 provides a signal which is a function of the rate of rotation of shaft 62. Sensor 74 may be any typical rotary motion sensor such as a commercially available Microsyn device. The signal from sensor 74 is submitted to comparator 76 along with a similar signal from another rotary motion sensor 78 associated with shaft 28 rotatable with pitch mirror 26. Any difference between the rate of rotation of gyro 60 and that of shaft 28 results in an output signal from comparator 76, which may be a null device, summing circuit, differencing amplifier or the like, which is applied to a torque motor 80 to adjust the rate of rotation of pitch mirror 26 to that of the instrument. Since the entire comparing or differencing operation is carried out instantaneously, the resulting error signal enables the pitch mirrors to provide continuous compensation for movements of the instrument and arrest any vertical vibration of the image at the eyepiece 32.

Between comparator 76 and motor 80 is a filter 82 which in the pan mode prevents error signals of less than three or four cycles per second from being introduced to motor 80. In the full stabilization mode filter 82 is bypassed so that all vibrations, no matter how slow, will be compensated for. A mode selector 84 which may take the form of a trigger switch on handle 14, FIG. 1, selects either the pan or full stabilization mode of operation.

The full stabilization mode is normally utilized when the instrument is being held steady and the user desires the utmost stability for clarity and detail in the image of a particular object. Under these conditions ever vibration or movement is compensated for and a stable image is presented to the user. The pan mode is selected when the user wishes to scan or sweep an area with the instrument. In this mode, if low frequency motion was corrected for, the correction system would try to compensate for the sweeping motion of the instrument intentionally introduced by the user. As a result the LOS would be shifted in the opposite direction to that of the scan and would lag the scan. In aggravated cases the LOS would be shifted so much that it would not clear the forward aperture of the instrument, lens 18, and the image would be lost. The mode selector feature enables full stabilization capability without curtailing the essential ability to pan.

Image stabilization for motions 72' about the yaw axis is provided in the same manner as that about the pitch axis. For that reason elements in the yaw correcting portion of the apparatus have been given the same numbers, primed, as like elements discussed in reference to the pitch correcting portion. Operation of the two portions is the same so the explanation has not been repeated. However, in the yaw portion of the apparatus yaw gyro 60' has its spin axis parallel to the LOS in order that it respond to rotation about the yaw axis, vectors 64', 66', and provide a reaction force about shaft 62'.

As initially set forth, correction may be obtained in both the pitch and yaw axes by means of a single mirror 90, FIG. 5, rotatable about both axes. Mirror 90 is rotatably supported parallel to the yaw axis on shaft 92 rotatably supported in gimbal ring 94 which is rotatably supported parallel to the pitch axis on shaft 96. Rotational motion sensors 98 and 100 deliver signals to comparators such as comparators 76 and 76', in the same manner as do sensors 78 and 78', and torque motors 102 and 104 respond, in the same manner as motors 80 and 80', to drive mirror 90 to compensate for instrument rotations. Such an arrangement provides image stabilization normal to the LOS in a fully color responsive system using but a single adjusting element.

This invention applies to all types of optical equipment wherein image stabilization is desired and applies to apparatus utilizing many types of electromagnetic radiation such as ultraviolet, infrared, and X-ray.

Other embodiments will occur to those skilled in the art and are within the following claims:

What we claim is:

1. Image motion stabilizer apparatus for compensating for image motion in an optical instrument due to instrument rotations normal to the line of sight of the instrument comprising:
   a. first radiation reflection means positioned along the optic axis of the instrument, said first radiation reflection means being adjustable to adjust the radiation reflection angle about a first axis normal to said line of sight;
   b. means for detecting the position of said first radiation reflection means about said first axis, and for producing a first electrical signal indicative thereof;
   c. means for sensing the rate of rotation of said instrument about said first axis and for utilizing the sensed rate to produce a second electrical signal;

d. means for comparing said first and second electrical signals and for producing a third signal indicative of said comparison;

e. means, responsive to said third electrical signal, for adjusting the position of said first radiation reflection means about said first axis to compensate for instrument rotations about said first axis;

f. second radiation reflection means positioned along the optic axis of the instrument, said second radiation reflection means being adjustable to adjust the radiation reflection angle about a second axis normal to both said line of sight and said first axis;

g. means for detecting the position of said second radiation reflection means about said second axis, and for producing a fourth electrical signal indicative thereof;

h. means for sensing the rate of rotation of said instrument about said second axis and for utilizing the sensed rate to produce a fifth electrical signal;

i. means for comparing said fourth and fifth electrical signals and for producing a sixth electrical signal indicative of said comparison; and j. means, responsive to said sixth electrical signal, for adjusting the position of said second radiation reflection means about said second axis to compensate for instrument rotations about said second axis.

2. Apparatus as set forth in claim 1 further including mode selector means for enabling the instrument to be operated in a pan mode without compensation for image motion in the optical instrument due to instrument rotation below a predetermined rate of rotation including first means, interposed between said means for producing a third electrical signal and said means for adjusting the position of said first radiation reflection means, for preventing the passage of electrical signals indicative of instrument rotation below said predetermined rate to said means for adjusting the position of said first radiation reflection means, and second means, interposed between said means for producing a sixth electrical signal and said means for adjusting the position of said second radiation reflection means, for preventing the passage of electrical signals indicative of instrument rotations below a predetermined rate to said means for adjusting the position of said second radiation reflection means, 3. Apparatus as set forth in claim 2 wherein said means for sensing the rate of rotation of said instrument about said first axis includes a rate gyro responsive to rotation about said first axis, and said means for sensing the rate of rotation of said instrument about said second axis includes a rate gyro responsive to rotation about said second axis.

4. Apparatus as set forth in claim 3 further including an objective lens positioned at the forward portion of said optic axis between the viewed object and said image motion stabilizer apparatus.

5. Apparatus as set forth in claim 1 wherein said means for sensing the rate of rotation of said instrument about said first axis includes a rate gyro responsive to rotation about said first axis, and said means for sensing the rate of rotation of said instrument about said second axis includes a rate gyro responsive to rotation about said second axis.

6. Apparatus as set forth in claim 1 further including an objective lens positioned at the forward portion of said optic axis between the viewed object and said image motion stabilizer apparatus.

UNITED STATES PATENT OFFICE
CERTIFICATE OF CORRECTION

Patent No. 3,591,250     Dated July 6, 1971

Inventor(s) Herbert William Feinstein et al.

It is certified that error appears in the above-identified patent and that said Letters Patent are hereby corrected as shown below:

On the cover sheet [73], "Stek Corporation" should read -- Itek Corporation --.

Signed and sealed this 12th day of September 1972.

(SEAL)
Attest:

EDWARD M. FLETCHER, JR.                ROBERT GOTTSCHALK
Attesting Officer                      Commissioner of Patents